United States Patent
Kojo et al.

(10) Patent No.: US 11,156,515 B2
(45) Date of Patent: Oct. 26, 2021

(54) VEHICLE CONTROL SYSTEM

(71) Applicant: TOYOTA JIDOSHA KABUSHIKI KAISHA, Toyota (JP)

(72) Inventors: Takahiro Kojo, Gotemba (JP); Yoji Kunihiro, Susono (JP); Ryo Irie, Okazaki (JP); Hisaya Akatsuka, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 295 days.

(21) Appl. No.: 16/380,453

(22) Filed: Apr. 10, 2019

(65) Prior Publication Data

US 2019/0331544 A1 Oct. 31, 2019

(30) Foreign Application Priority Data

Apr. 27, 2018 (JP) .............................. JP2018-087216

(51) Int. Cl.
*G01L 5/22* (2006.01)
*B60W 10/20* (2006.01)
(Continued)

(52) U.S. Cl.
CPC ............. *G01L 5/221* (2013.01); *B60W 10/20* (2013.01); *B62D 1/286* (2013.01); *B62D 5/0463* (2013.01);
(Continued)

(58) Field of Classification Search
CPC . G01L 5/221; B60W 10/20; B60W 30/18036; B62D 15/021; B62D 1/286;
(Continued)

(56) References Cited

U.S. PATENT DOCUMENTS

2013/0325263 A1* 12/2013 Yang .................... B62D 5/0457
701/42
2016/0107597 A1* 4/2016 Won ...................... G08G 1/167
340/439
(Continued)

FOREIGN PATENT DOCUMENTS

| AU | 2014200619 A1 | 9/2014 |
| JP | 2008-290679 A | 12/2008 |
| JP | 2014-172610 A | 9/2014 |

OTHER PUBLICATIONS

Machine Translation of JP 2008-290679 retrieved from espacenet on Mar. 27, 2021 (Year: 2021).*

*Primary Examiner* — Thomas Ingram
(74) *Attorney, Agent, or Firm* — Sughrue Mion, PLLC

(57) ABSTRACT

A turning mechanism of a vehicle turns a wheel and is coupled to a steering wheel through a steering shaft. A torque sensor detects a torque applied to a first position of the steering shaft, as a sensor-detected torque. An upper friction torque is an absolute value of the sensor-detected torque that is caused by a friction force acting on the steering shaft between the first position and the steering wheel when the steering shaft is rotated. A vehicle control system repeatedly estimates the upper friction torque and variably sets a determination threshold to the estimated upper friction torque or more. The vehicle control system determines whether a driver state is a hands-on state or a hands-off state based on a comparison between the absolute value of the sensor-detected torque and the determination threshold.

1 Claim, 16 Drawing Sheets

(51) Int. Cl.
*B62D 15/02* (2006.01)
*B62D 1/28* (2006.01)
*B62D 6/10* (2006.01)
*G05D 1/00* (2006.01)
*B62D 5/04* (2006.01)

(52) U.S. Cl.
CPC ............. *B62D 6/10* (2013.01); *B62D 15/021* (2013.01); *B62D 15/025* (2013.01); *G05D 1/0088* (2013.01); *G05D 2201/0213* (2013.01)

(58) Field of Classification Search
CPC ...... B62D 6/10; B62D 15/025; B62D 5/0463; G05D 1/0088; G05D 2201/0213
See application file for complete search history.

(56) References Cited

U.S. PATENT DOCUMENTS

| | | | |
|---|---|---|---|
| 2017/0166243 A1* | 6/2017 | Sugawara | B62D 5/0463 |
| 2018/0297630 A1* | 10/2018 | Kim | B62D 3/12 |
| 2019/0009816 A1* | 1/2019 | Moreillon | B62D 1/286 |
| 2019/0291777 A1* | 9/2019 | Ishio | B62D 6/00 |

* cited by examiner

VEHICLE CONTROL SYSTEM

BACKGROUND

Technical Field

The present disclosure relates to a vehicle control system installed on a vehicle. In particular, the present disclosure relates to a vehicle control system that executes automatic steering control.

Background Art

Patent Literature 1 discloses a steering assist device installed on a vehicle. The steering assist device executes lane keeping control such that the vehicle travels along a lane. More specifically, the steering assist device calculates an assist torque necessary for the lane keeping control and controls an EPS (Electric Power Steering) motor such that the assist torque is applied to a turning mechanism.

The steering assist device further has a function of determining whether or not a driver is performing a steering operation. In the determination processing, both a friction torque Tg caused by gear friction in the turning mechanism and a friction torque Tf caused by gear friction in a steering column are taken into consideration. The friction torques Tg and Tf are beforehand estimated through tests and given fixed values. When the assist torque by the EPS motor is greater than the friction torque Tg and a steering torque detected by a torque sensor is greater than the friction torque Tf, the steering assist device determines that the driver is performing the steering operation.

Patent Literature 2 discloses a method of recognizing increase in gear friction inside a rack drive type EPS device. According to the method, a test current is supplied to a servomotor in the EPS device, and a resultant change in a rotor position is detected. Increase in the gear friction is recognized based on a result of comparison between the detected change in the rotor position and an expected value.

LIST OF RELATED ART

Patent Literature 1: Japanese Unexamined Patent Application Publication No. JP-2008-290679
Patent Literature 2: Japanese Unexamined Patent Application Publication No. JP-2014-172610

SUMMARY

Let us consider a vehicle control system executing "automatic steering control" that automatically turns a wheel of a vehicle. During execution of the automatic steering control, a driver may intervene in steering of the vehicle. A driver state where the driver intervenes in the steering is called a "hands-on state".

Determining whether the driver state is the hands-on state or not is important for the automatic steering control. As an example, let us consider a case where the vehicle control system issues a transition demand. If the vehicle control system terminates the automatic steering control at a time when the driver state does not yet become the hands-on state, the vehicle may depart from a lane. It is preferable that the vehicle control system terminates the automatic steering control after confirming that the driver state is the hands-on state.

According to the technique disclosed in the above-mentioned Patent Literature 1, the friction torques caused by the gear friction in the turning mechanism and the steering column are considered when it is determined whether the driver state is the hands-on state or not. The friction torques are beforehand estimated through tests and given fixed values.

However, a magnitude of the friction torque varies according to a temperature environment and aged deterioration of parts. Therefore, when the friction torque is given a fixed value, the friction torque is highly likely to deviate from an actual value. Increase in the deviation causes decrease in accuracy of the determination of whether the driver state is the hands-on state or not.

An object of the present disclosure is to provide a technique that relates to the vehicle control system executing the automatic steering control and can improve accuracy of the determination of whether the driver state is the hands-on state or not.

A first aspect is directed to a vehicle control system installed on a vehicle.

The vehicle includes:
a wheel;
a steering wheel; and
a turning mechanism coupled to the steering wheel through a steering shaft and configured to turn the wheel according to a rotating operation of the steering wheel.

The vehicle control system includes:
a torque sensor configured to detect a torque applied to a first position of the steering shaft, as a sensor-detected torque; and
a control device configured to execute automatic steering control that turns the wheel.

An upper friction torque is an absolute value of the sensor-detected torque that is caused by a friction force acting on the steering shaft between the first position and the steering wheel when the steering shaft is rotated.

A hands-on state is a driver state where a driver of the vehicle intervenes in steering of the vehicle.

A hands-off state is a driver state other than the hands-on state.

The control device is further configured to execute:
upper friction estimation processing that repeatedly estimates the upper friction torque based on the sensor-detected torque when the wheel is turned;
threshold setting processing that variably sets a determination threshold to be equal to or greater than an estimated value of the upper friction torque; and
driver state determination processing that determines that the driver state is the hands-on state when the absolute value of the sensor-detected torque is greater than the determination threshold, and determines that the driver state is the hands-off state when the absolute value of the sensor-detected torque is the determination threshold or less.

A second aspect further has the following feature in addition to the first aspect.

The control device determines whether or not the driver takes hands off the steering wheel.

When the driver takes the hands off the steering wheel during execution of the automatic steering control, the control device executes the upper friction estimation processing.

A third aspect further has the following feature in addition to the second aspect.

In the upper friction estimation processing, the control device estimates the absolute value of the sensor-detected torque at a time when the steering wheel starts to be rotated due to the automatic steering control, as the upper friction torque.

A fourth aspect further has the following feature in addition to the second aspect.

In the upper friction estimation processing, the control device estimates a half of a hysteresis width of the sensor-detected torque due to the automatic steering control, as the upper friction torque.

According to the present disclosure, the vehicle control system executes the driver state determination processing based on a comparison between the sensor-detected torque and the determination threshold. Furthermore, the vehicle control system variably sets the determination threshold according to a variation in the upper friction torque. More specifically, the vehicle control system repeatedly estimates the upper friction torque and sets the determination threshold to be equal to or greater than the estimated value of the upper friction torque. As a result, accuracy of the driver state determination processing is improved.

EMBODIMENTS

Embodiments of the present disclosure will be described below with reference to the attached drawings.

1. OUTLINE OF VEHICLE CONTROL SYSTEM

Figure 1:
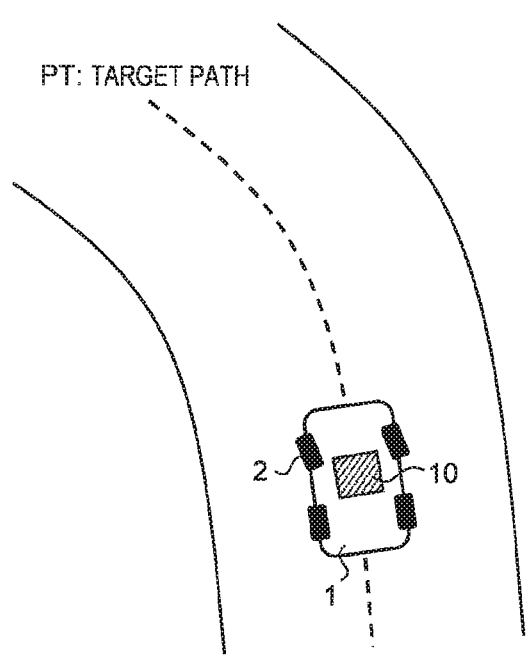
FIG. 1 is a conceptual diagram for explaining an outline of a vehicle control system according to an embodiment of the present disclosure.

FIG. 1 is a conceptual diagram for explaining an outline of a vehicle control system 10 according to the present embodiment. The vehicle control system 10 is installed on a vehicle 1 and controls an operation of the vehicle 1. More specifically, the vehicle control system 10 executes at least "automatic steering control" that automatically controls steering of the vehicle 1. The steering of the vehicle 1 means turning of a wheel 2 of the vehicle 1.

For example, the vehicle control system 10 determines a target path PT (target trajectory) as shown in FIG. 1. Then, the vehicle control system 10 executes the automatic steering control such that the vehicle 1 follows the target path PT. Such the automatic steering control is executed in lane tracing assist (LTA) control, automated driving control, and the like. In the case of the automated driving control, the vehicle control system 10 executes not only the automatic steering control but also "automatic travel control" that automatically controls travel (acceleration and deceleration) of the vehicle 1.

Figure 2:
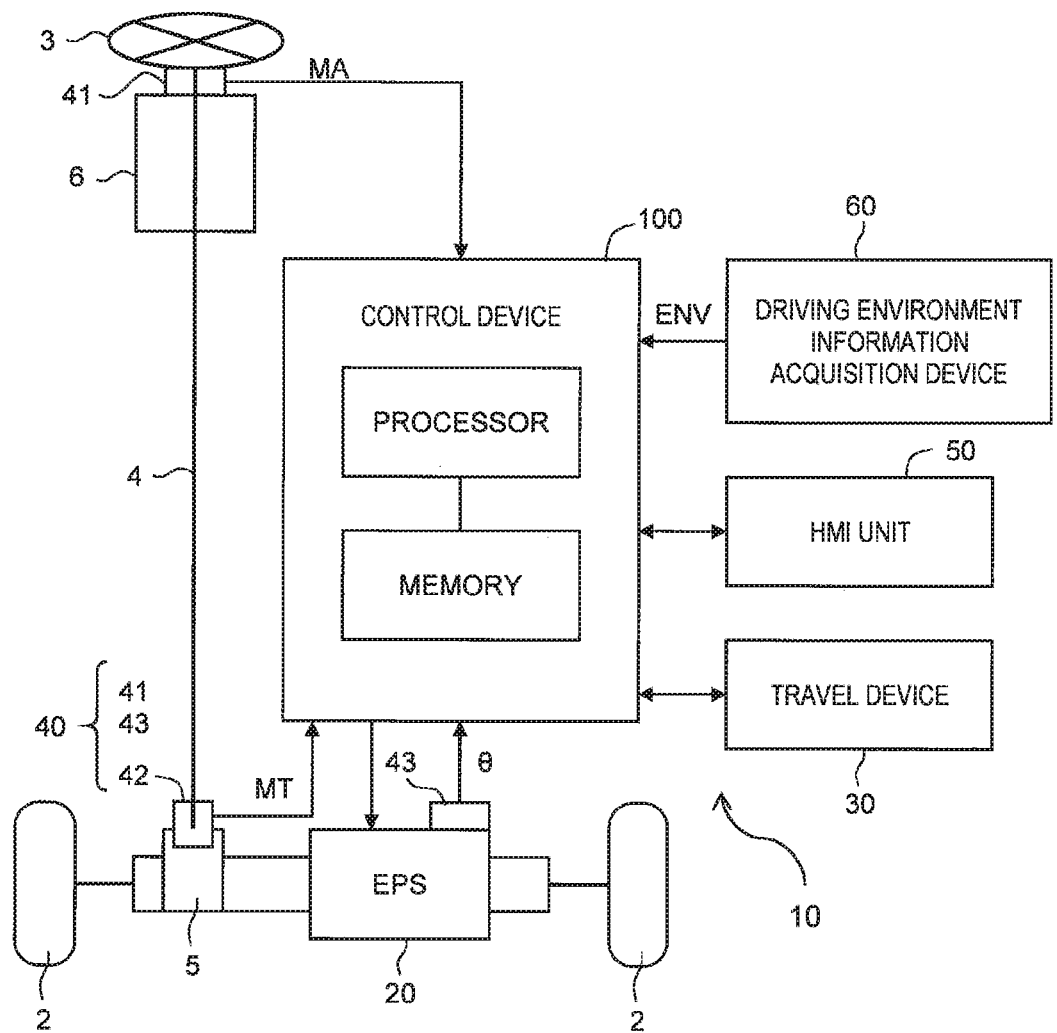
FIG. 2 is a block diagram showing a concrete configuration example of a vehicle and the vehicle control system according to the embodiment of the present disclosure.

FIG. 2 is a block diagram showing a concrete configuration example of the vehicle 1 and the vehicle control system 10 according to the present embodiment.

The vehicle 1 is provided with the wheel 2, a steering wheel 3, a steering shaft 4, a turning mechanism 5, and a steering column 6. The steering wheel 3 is an operation member used by a driver for performing a steering operation. One end of the steering shaft 4 is coupled to the steering wheel 3, and the other end thereof is coupled to the turning mechanism 5. The turning mechanism 5 turns the wheel 2 according to a rotating operation of the steering wheel 3. More specifically, the turning mechanism 5 includes a pinion gear coupled to the steering shaft 4, a rack bar engaging with the pinion gear, a tie rod connecting between the rack bar and the wheel 2. A rotation of the steering wheel 3 is transmitted to the pinion gear through the steering shaft 4. A rotational motion of the pinion gear is converted into a linear motion of the rack bar, and thereby a steering angle θ of the wheel 2 changes.

The vehicle control system 10 includes an EPS (Electric Power Steering) device 20, a travel device 30, a sensor group 40, an HMI (Human Machine Interface) unit 50, a driving environment information acquisition device 60, and a control device (controller) 100.

The EPS device 20 includes an electric motor and turns the wheel 2 by a rotation of the electric motor. For example, the electric motor is coupled to the rack bar through a conversion mechanism. When a rotor of the electric motor rotates, the conversion mechanism converts the rotational motion into a linear motion of the rack bar, and thereby the steering angle θ of the wheel 2 changes. It should be noted that the EPS device 20 is not limited to a rack assist type one. For example, the EPS device 20 may be a column assist type one. An operation of the EPS device 20 is controlled by the control device 100.

The travel device 30 includes a driving device and a braking device. The driving device is a power source that generates a driving force. The driving device is exemplified by an engine and an electric motor. The braking device generates a braking force. An operation of the travel device 30 is controlled by the control device 100.

The sensor group 40 detects a state of the vehicle 1. For example, the sensor group 40 includes a steering wheel angle sensor 41, a torque sensor 42, and a steering angle sensor 43.

The steering wheel angle sensor 41 detects a steering wheel angle MA being a steering angle of the steering wheel 3. The steering wheel angle sensor 41 outputs information indicating the steering wheel angle MA to the control device 100.

The torque sensor 42 detects a torque applied to the steering shaft 4. More specifically, the torque sensor 42 is installed at a predetermined position (first position) of the steering shaft 4 and detects a torque applied to the predetermined position. The torque detected by the torque sensor 42 is hereinafter referred to as a "sensor-detected torque MT". The torque sensor 42 outputs information indicating the sensor-detected torque MT to the control device 100.

The steering angle sensor 43 detects the steering angle $\theta$ of the wheel 2. For example, the steering angle sensor 43 calculates the steering angle $\theta$ from a rotation angle of the electric motor of the EPS device 20. The steering angle sensor 43 outputs information indicating the steering angle $\theta$ to the control device 100.

The HMI unit 50 is an interface for proving the driver with information and receiving information from the driver. More specifically, the HMI unit 50 includes an input device and an output device. The input device is exemplified by a touch panel, a switch, a microphone, and the like. The output device is exemplified by a display device, a speaker, and the like.

The driving environment information acquisition device 60 acquires "driving environment information ENV" indicating driving environment for the vehicle 1. The driving environment information ENV includes position information, map information, surrounding situation information, vehicle state information, and so forth. The position information is information indicating a position of the vehicle 1, and is acquired by the use of a GPS (Global Positioning System) for example. The map information indicates a lane configuration and a road shape. The surrounding situation information is information indicating a situation around the vehicle 1, and is acquired by the use of an external sensor such as a camera, a LIDAR, a radar, and the like. For example, the surrounding situation information includes information of a surrounding vehicle and a white line around the vehicle 1. The vehicle state information includes a vehicle speed, a lateral acceleration, a yaw rate, and so forth. The vehicle state information is acquired by the sensor group 40. The driving environment information acquisition device 60 transmits the acquired driving environment information ENV to the control device 100.

The control device (controller) 100 is a microcomputer provided with a processor and a memory. The control device 100 is also called an ECU (Electronic Control Unit). A variety of processing by the control device 100 is achieved by the processor executing a control program stored in the memory. Hereinafter, a functional configuration of the control device 100 according to the present embodiment will be described in more detail.

2. FUNCTIONAL CONFIGURATION OF CONTROL DEVICE

Figure 3:
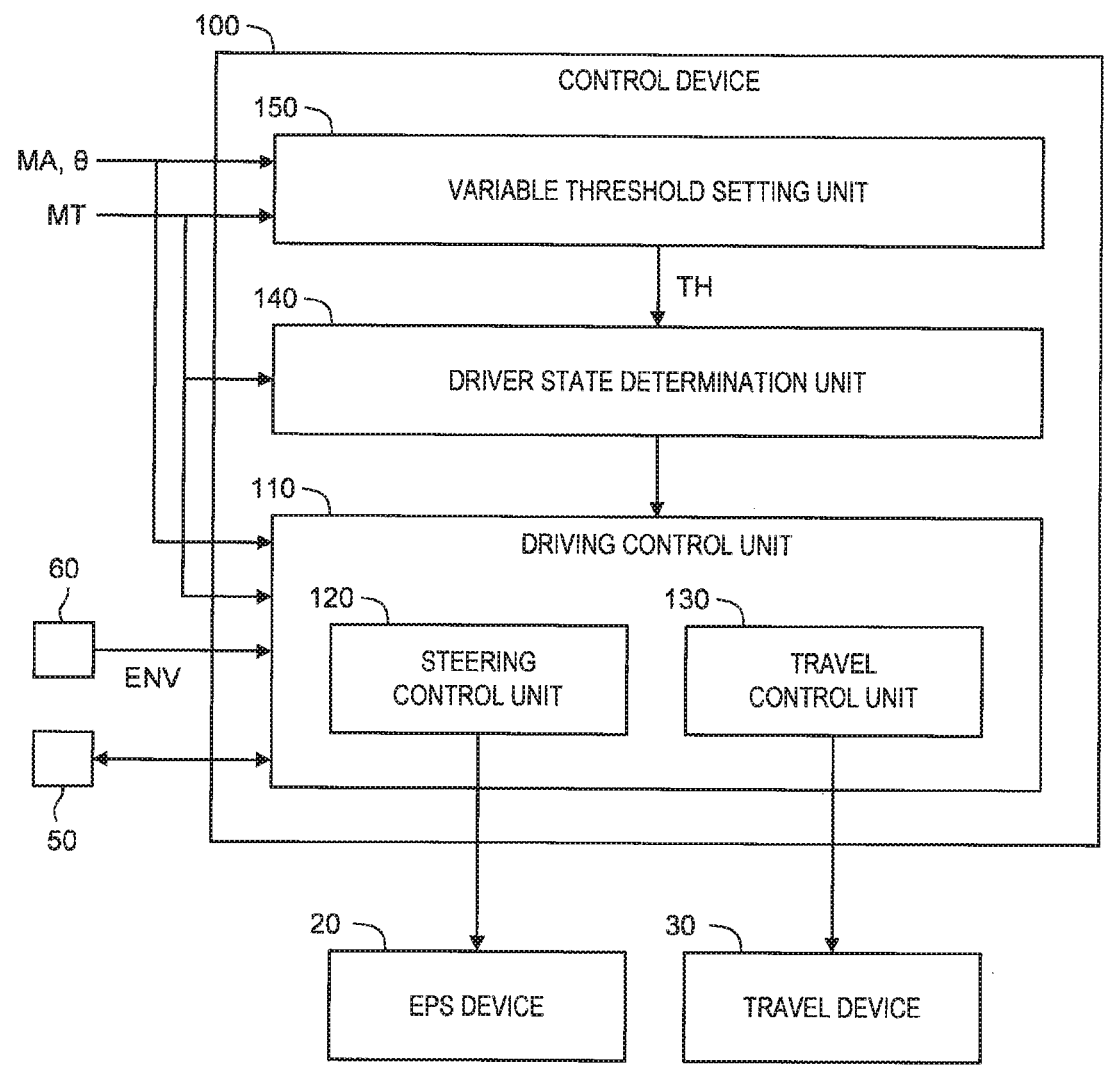
FIG. 3 is a block diagram showing a functional configuration of a control device of the vehicle control system according to the embodiment of the present disclosure.

FIG. 3 is a block diagram showing a functional configuration of the control device 100 according to the present embodiment. The control device 100 includes a driving control unit 110, a driver state determination unit 140, and a variable threshold setting unit 150 as functional blocks. These functional blocks are achieved by the processor of the control device 100 executing a control program stored in the memory.

2-1. Driving Control Unit 110

The driving control unit 110 controls driving of the vehicle 1. More specifically, the driving control unit 110 includes a steering control unit 120 that controls steering of the vehicle 1 and a travel control unit 130 that controls travel (acceleration and deceleration) of the vehicle 1.

The steering control unit 120 executes steering assist control that assists the steering operation by the driver. More specifically, the steering control unit 120 calculates an assist torque based on the sensor-detected torque MT and the vehicle speed. Then, the steering control unit 120 controls the operation of the EPS device 20 such that the assist torque is generated. As a result, a steering load of the driver is reduced.

Moreover, the steering control unit 120 executes the "automatic steering control" that automatically turns the wheel 2. The EPS device 20 is utilized also in the automatic steering control. More specifically, the steering control unit 120 determines a steering angle command value $\theta^*$ being a target value of the steering angle $\theta$ of the wheel 2. In addition, the steering control unit 120 acquires the information of the steering angle $\theta$ from the steering angle sensor 43. Alternatively, the steering control unit 120 may calculate the steering angle $\theta$ from the steering wheel angle MA. Then, the steering control unit 120 controls the operation of the EPS device 20 such that the steering angle $\theta$ follows the steering angle command value $\theta^*$.

For example, the steering control unit 120 executes the automatic steering control such that the vehicle 1 travels with following the target path PT (see FIG. 1). To that end, the steering control unit 120 calculates the target path PT and a target path steering angle $\theta$ pt based on the driving environment information ENV. The target path steering angle $\theta$ pt is the steering angle $\theta$ necessary for the vehicle 1 to travel with following the target path PT. Various examples have been proposed as a method of calculating the target path PT and the target path steering angle $\theta$ pt. In the present embodiment, the method of calculating thereof is not limited in particular. The steering control unit 120 sets the steering angle command value $\theta^*$ to the target path steering angle $\theta$ pt, and controls the operation of the EPS device 20 such that the steering angle $\theta$ follows the target path steering angle $\theta$ pt. As a result, the vehicle 1 travels so as to follow the target path PT. Such the automatic steering control is executed in the automated driving control, the LTA, and the like.

The travel control unit 130 executes "automatic travel control" that automatically controls travel of the vehicle 1. The automatic travel control includes acceleration control and deceleration control. The travel control unit 130 executes the automatic travel control by controlling the operation of the travel device 30 (the driving device and the braking device). For example, the travel control unit 130 executes the automatic travel control such that the vehicle 1 travels with following the target path PT.

The driving control unit 110 may execute "automated driving control" including both of the above-described automatic steering control and automatic travel control.

In addition, the driving control unit 110 issues various notifications to the driver through the HMI unit 50 (output device). The notifications are exemplified by an alert, a transition demand (TD), and so forth. The transition demand requests the driver to start manual driving.

The driver can use the HMI unit 50 (input device) to turn ON/OFF (activate/deactivate) the driving control (i.e. the automatic steering control, the automatic travel control, and the automated driving control) executed by the driving control unit 110.

2-2. Driver State Determination Unit 140

During execution of the automatic steering control by the driving control unit 110, the driver may intervene in steering of the vehicle 1. A driver state where the driver intervenes in steering of the vehicle 1 is hereinafter referred to as a "hands-on state". For example, a driver state where the driver performs the steering operation, that is, the driver actively operates the steering wheel 3 is the hands-on state. As another example, a driver state where the driver holds the steering wheel 3 to counteract the automatic steering control by the driving control unit 110 also is the hands-on state.

On the other hand, a driver state where the driver does not intervene in steering of the vehicle 1 is hereinafter referred to as a "hands-off state". It can be said that the hands-off state is the driver state other than the hands-on state.

Determining whether the driver state is the hands-on state or the hands-off state is important for the automatic steering control. As an example, let us consider a case where the above-mentioned transition demand is issued from the driving control unit 110. If the driving control unit 110 terminates the automatic steering control at a time when the driver state does not yet become the hands-on state, the vehicle 1 may depart from a lane. It is preferable that the driving control unit 110 terminates the automatic steering control after confirming that the driver state is the hands-on state.

For that purpose, the driver state determination unit 140 is provided. The driver state determination unit 140 executes "driver state determination processing" that determines whether the driver state is the hands-on state or the hands-off state. More specifically, the driver state determination unit 140 compares the sensor-detected torque MT detected by the torque sensor 42 with a "determination threshold TH". When an absolute value of the sensor-detected torque MT is greater than the determination threshold TH (IMTI>TH), the driver state determination unit 140 determines that the driver state is the hands-on state. On the other hand, when the absolute value of the sensor-detected torque MT is equal to or less than the determination threshold TH (IMTI≤TH), the driver state determination unit 140 determines that the driver state is the hands-off state.

2-3. Variable Threshold Setting Unit 150

The variable threshold setting unit 150 sets the determination threshold TH used in the above-described driver state determination processing. What should be noted in the setting of the determination threshold TH is a friction force caused by parts such as gears. The reason is that a friction torque caused by the friction force can be included in the sensor-detected torque MT.

In the present embodiment, we especially focus on an "upper friction force" upstream of the torque sensor 42. More specifically, the upper friction force is a friction force acting on the steering shaft 4 between the installation position (i.e. the first position) of the torque sensor 42 and the steering wheel 3 when the steering shaft 4 is rotated. For example, the upper friction force is caused by parts such as gears in the steering column 6. When the steering shaft 4 is rotated, the sensor-detected torque MT detected by the torque sensor 42 includes a friction torque caused by the upper friction force. An absolute value of a component of the sensor-detected torque MT caused by the upper friction force is hereinafter referred to as an "upper friction torque TF".

Let us consider a situation where the driver takes hands off the steering wheel 3 (i.e. a hands-free state). When the driving control unit 110 executes the automatic steering control to turn the wheel 2, the steering shaft 4 and the steering wheel 3 also are rotated accordingly. In this case, the torque sensor 42 detects the upper friction torque TF caused by the upper friction force as the sensor-detected torque MT. That is, non-zero upper friction torque TF is detected as the sensor-detected torque MT although the driver takes hands off the steering wheel 3.

In order to prevent erroneous determination of the driver state, the determination threshold TH is set to be equal to or greater than the upper friction torque TF. However, a magnitude of the upper friction torque TF is not constant but varies. More specifically, the magnitude of the upper friction torque TF varies according to a temperature environment and aged deterioration of parts.

In view of the above, according to the present embodiment, the variable threshold setting unit 150 variably sets the determination threshold TH according to the variation in the upper friction torque TF. More specifically, the variable threshold setting unit 150 repeatedly estimates the upper friction torque TF. Moreover, the variable threshold setting unit 150 sets the determination threshold TH to be equal to or greater than the estimated value of the upper friction torque TF. As a result, accuracy of the driver state determination processing is improved. This contributes to increase in confidence in the vehicle control system 10.

Hereinafter, variable threshold setting processing by the variable threshold setting unit 150 according to the present embodiment will be described in more detail.

3. VARIABLE THRESHOLD SETTING PROCESSING

3-1. Inverse-Input Friction Estimation Method

First, we describe a method of estimating the upper friction torque TF in a hands-free state where the driver takes hands off the steering wheel 3. The method is hereinafter referred to as an "inverse-input friction estimation method".

Figure 4:
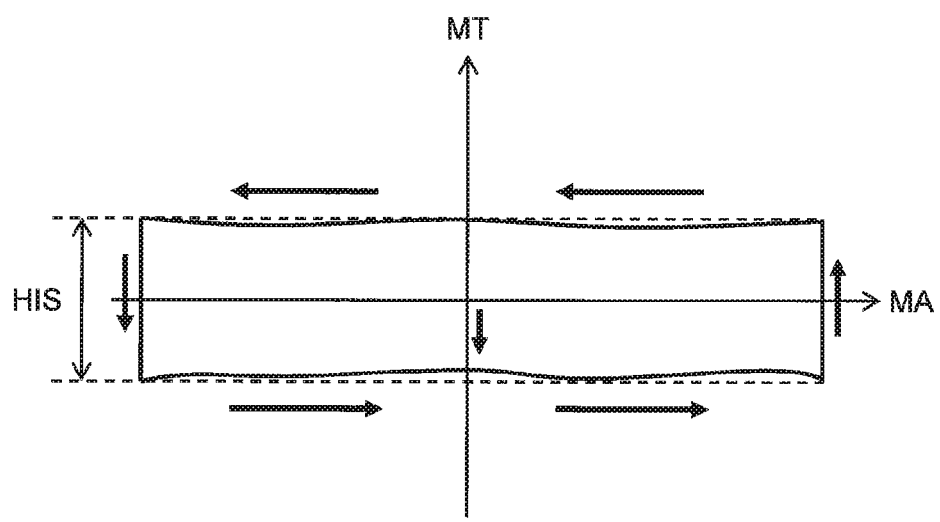
FIG. 4 is a conceptual diagram for explaining an inverse-input friction estimation method in the embodiment of the present disclosure.

FIG. 4 is a conceptual diagram for explaining the inverse-input friction estimation method. In the case of the hands-free state, the driving control unit 110 executes the automatic steering control to turn the wheel 2. FIG. 4 shows variation of the sensor-detected torque MT when the wheel 2 is turned by the automatic steering control in the hands-free state. A vertical axis represents the sensor-detected torque MT, and a horizontal axis represents a turn parameter representing turning of the wheel 2. In the example shown in FIG. 4, the steering wheel angle MA is used as the turn parameter. It is also possible to use the steering angle θ, the yaw rate, or the lateral acceleration instead of the steering wheel angle MA.

When the wheel 2 is turned in the hands-free state, the steering wheel 3 is rotated accordingly and the torque is generated in an opposite direction to that in the case of the steering operation by the driver, as shown in FIG. 4. More specifically, the sensor-detected torque MT takes a negative value when the steering wheel angle MA increases, and the sensor-detected torque MT takes a positive value when the steering wheel angle MA decreases. In either case, the absolute value of the sensor-detected torque MT is almost constant. The constant value corresponds to the upper friction torque TF. It can be said that the upper friction torque TF is the absolute value of the sensor-detected torque MT at a time when the steering wheel 3 starts to be rotated due to the automatic steering control in the hands-free state.

Moreover, as shown in FIG. 4, a hysteresis width HIS of the sensor-detected torque MT is almost constant regardless of the steering wheel angle MA. A half of the hysteresis width HIS corresponds to the upper friction torque TF.

The variable threshold setting unit 150 estimates the upper friction torque TF based on the sensor-detected torque MT when the wheel 2 is turned by the automatic steering control. More specifically, the variable threshold setting unit 150 estimates the absolute value of the sensor-detected torque MT at a time when the steering wheel 3 starts to be rotated due to the automatic steering control, as the upper friction torque TF. As another example, the variable threshold setting unit 150 estimates a half of the hysteresis width HIS of the sensor-detected torque MT due to the automatic steering control, as the upper friction torque TF. Using the hysteresis width HIS makes it possible to eliminate influence of noises and oscillating components.

Figure 5:
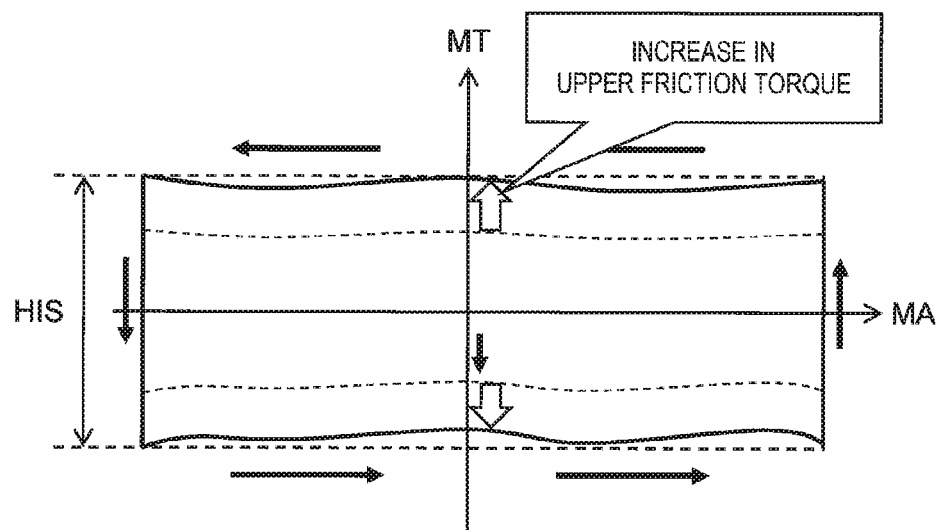
FIG. 5 is a conceptual diagram for explaining the inverse-input friction estimation method in the embodiment of the present disclosure.

FIG. 5 shows a situation where the upper friction torque TF is increased. When the upper friction torque TF increases, the hysteresis width HIS also increases. The variable threshold setting unit 150 can obtain a latest value of the upper friction torque TF by repeatedly executing the estimation processing.

3-2. Normal-Input Friction Estimation Method

Next, we describe a method of estimating the upper friction torque TF in a steering state where the driver performs the steering operation. The method is hereinafter referred to as a "normal-input friction estimation method".

Figure 6:
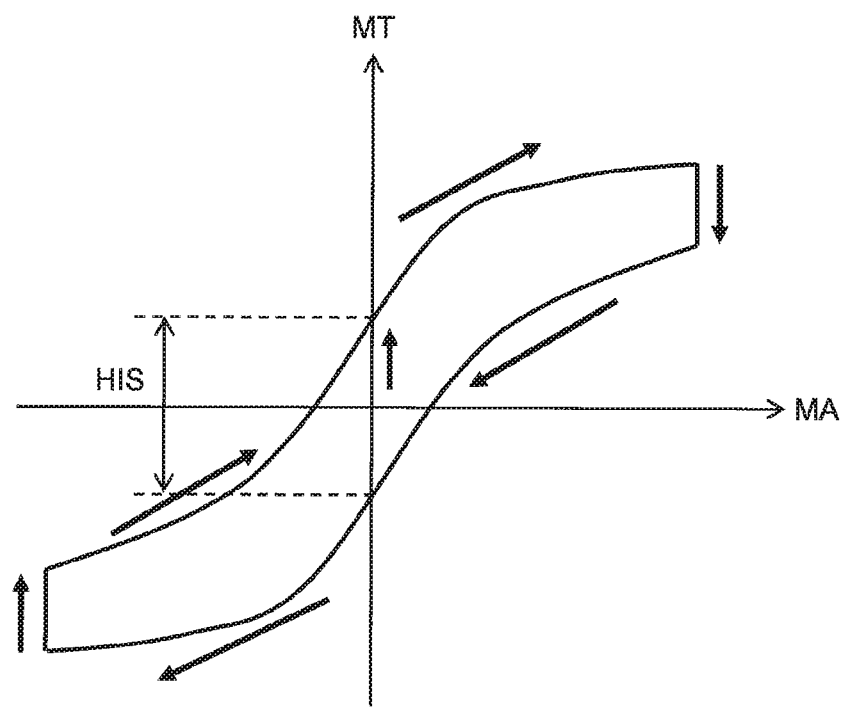
FIG. 6 is a conceptual diagram for explaining a normal-input friction estimation method in the embodiment of the present disclosure.

FIG. 6 is a conceptual diagram for explaining the normal-input friction estimation method. A format of FIG. 6 is the same as the foregoing FIG. 4. As is well known, the MA-MT characteristic in the steering state is represented by Lissajous waveform. Unlike in the case of FIG. 4, the absolute value of the sensor-detected torque MT is not constant. A variation tendency of the sensor-detected torque MT also is different from that in the case of FIG. 4. More specifically, the sensor-detected torque MT increases when the steering wheel angle MA increases. On the other hand, the sensor-detected torque MT decreases when the steering wheel angle MA decreases.

The variable threshold setting unit 150 estimates the upper friction torque TF based on the sensor-detected torque MT when the wheel 2 is turned by the driver's steering operation. More specifically, the variable threshold setting unit 150 estimates a half of the hysteresis width HIS of the sensor-detected torque MT at a steering angle neutral point (i.e. MA=0), as the upper friction torque TF.

It should be noted that the upper friction torque TF estimated by the normal-input friction estimation method may include an influence of a lower friction force. The lower friction force is a friction force on the wheel 2 side of the torque sensor 42. For example, the lower friction force is caused by gears in the turning mechanism 5. A lower friction torque is an absolute value of a component of the sensor-detected torque MT caused by the lower friction force, and is calculated in advance. The variable threshold setting unit 150 may estimate a value obtained by subtracting the lower friction torque from the half of the hysteresis width HIS, as the upper friction torque TF.

3-3. Functional Configuration Example Of Variable Threshold Setting Unit

Figure 7:
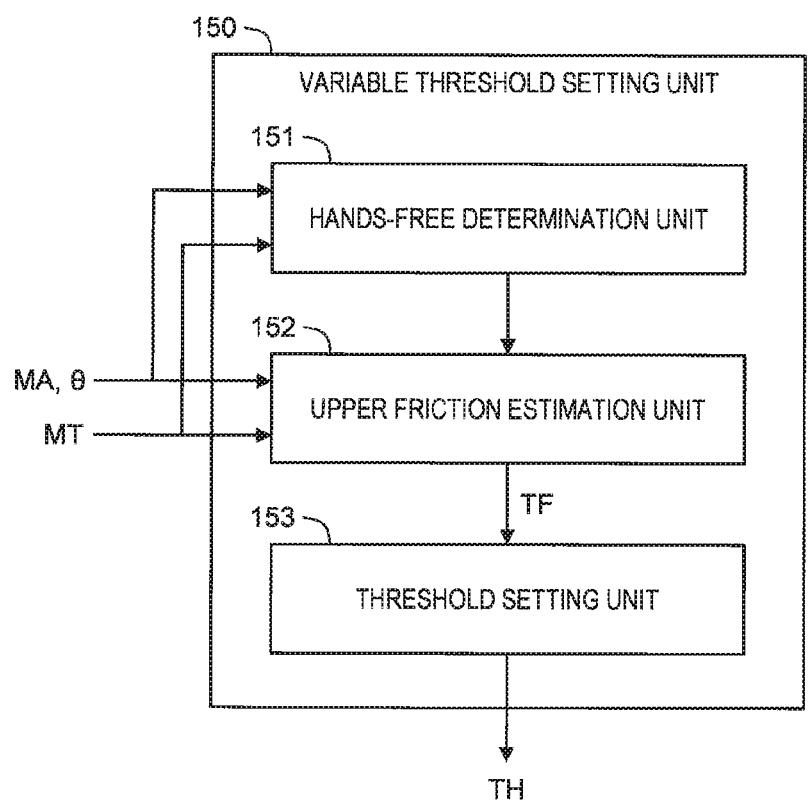
FIG. 7 is a block diagram showing an example of a functional configuration of a variable threshold setting unit according to the embodiment of the present disclosure.

FIG. 7 is a block diagram showing an example of a functional configuration of the variable threshold setting unit 150. The variable threshold setting unit 150 includes a hands-free determination unit 151, an upper friction estimation unit 152, and a threshold setting unit 153.

The hands-free determination unit 151 executes "hands-free determination processing". In the hands-free determination processing, the hands-free determination unit 151 determines whether or not the driver takes hands off the steering wheel 3. In other words, the hands-free determination unit 151 determines whether the driver state is the hands-free state or not.

For example, the hands-free determination unit 151 executes the hands-free determination processing based on the variation tendency of the sensor-detected torque MT when the wheel 2 is turned. In the case of the hands-free state, as shown in FIG. 4, the sensor-detected torque MT takes a negative value when the steering wheel angle MA increases, and the sensor-detected torque MT takes a positive value when the steering wheel angle MA decreases. On the other hand, in the case of FIG. 6, the sensor-detected torque MT increases when the steering wheel angle MA increases, and the sensor-detected torque MT decreases when the steering wheel angle MA decreases. It is therefore possible to determine whether the driver state is the hands-free state or not based on the variation tendency of the sensor-detected torque MT.

Figure 8:
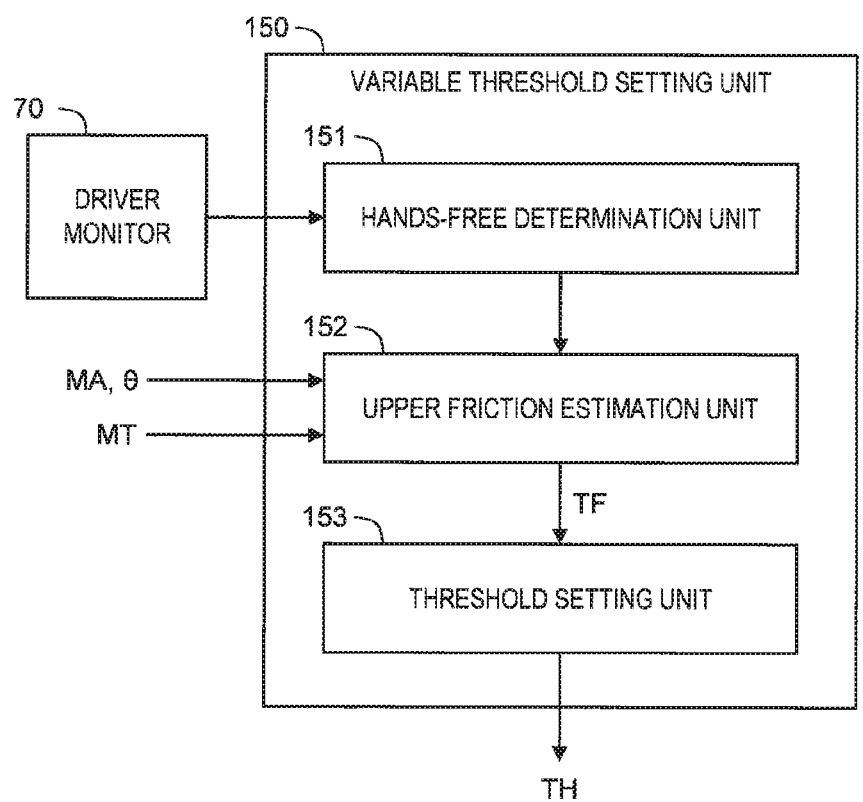
FIG. 8 is a block diagram showing another example of the functional configuration of the variable threshold setting unit according to the embodiment of the present disclosure.

FIG. 8 shows a modification example. In the modification example, the vehicle control system 10 further has a driver monitor 70. The driver monitor 70 includes a steering wheel touch sensor, a gap sensor, a camera, and the like. The hands-free determination unit 151 determines whether or not the driver takes hands off the steering wheel 3 based on a result of measurement by the driver monitor 70.

The upper friction estimation unit 152 executes "upper friction estimation processing". In the upper friction estimation processing, the upper friction estimation unit 152 repeatedly estimates the upper friction torque TF based on the sensor-detected torque MT when the wheel 2 is turned. In particular, when the driver takes hands off the steering wheel 3 during execution of the automatic steering control, the upper friction estimation unit 152 estimates the upper friction torque TF by the inverse-input friction estimation method (see FIGS. 4 and 5). As a result, it is possible to estimate the upper friction torque TF with high accuracy.

When the driver performs the steering operation, the upper friction estimation unit 152 may estimate the upper friction torque TF by the normal-input friction estimation method (see FIG. 6).

The threshold setting unit 153 executes "threshold setting processing". In the threshold setting processing, the threshold setting unit 153 variably sets the determination threshold TH according to the estimated upper friction torque TF. More specifically, the threshold setting unit 153 sets the determination threshold TH to be equal to or greater than the estimated value of the upper friction torque TF. For example, the determination threshold TH is expressed by the following Equation (1).

$$TH = TF + \alpha \leq LIM \qquad \text{Equation (1):}$$

In Equation (1), a parameter a is a margin considering an error, and a parameter LIM is an upper limit. When the determination threshold TH exceeds the upper limit LIM, the threshold setting unit 153 may notify the driver of abnormality through the HMI unit 50.

3-4. Flow Example of Variable Threshold Setting Processing

Figure 9:
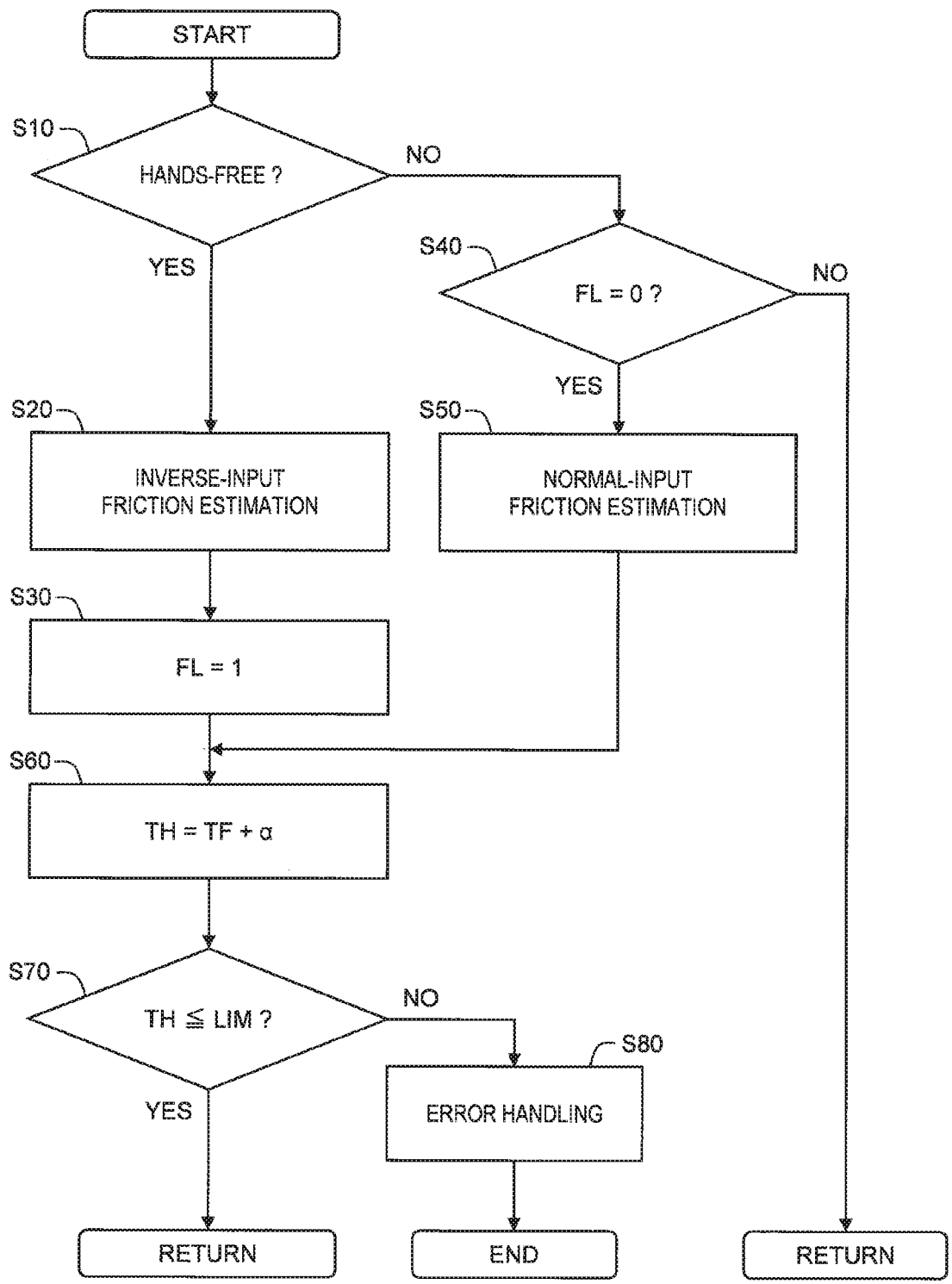
FIG. 9 is a flow chart showing an example of variable threshold setting processing according to the embodiment of the present disclosure.

FIG. 9 is a flow chart showing an example of the variable threshold setting processing by the variable threshold setting unit 150. A process flow shown in FIG. 9 is repeatedly executed every certain cycle.

In Step S10, the hands-free determination unit 151 executes the hands-free determination processing. When the driver takes hands off the steering wheel 3 (Step S10; Yes), the processing proceeds to Step S20. Otherwise (Step S10; No), the processing proceeds to Step S40.

In Step S20, the upper friction estimation unit 152 estimates the upper friction torque TF by the inverse-input friction estimation method (see FIGS. 4 and 5). After that, the processing proceeds to Step S30.

In Step S30, the upper friction estimation unit 152 sets a flag FL to "1". The flag FL indicates presence or absence of a history of the inverse-input friction estimation. An initial value of the flag FL is "0". After that, the processing proceeds to Step S60.

In Step S40, the upper friction estimation unit 152 determines whether or not the flag FL is "0". When the flag FL is "0" (Step S40; Yes), the processing proceeds to Step S50. On the other hand, when the flag FL is "1" (Step S40; No), the processing in the current cycle ends.

In Step S50, the upper friction estimation unit 152 estimates the upper friction torque TF by the normal-input friction estimation method (see FIG. 6). After that, the processing proceeds to Step S60.

In Step S60, the threshold setting unit 153 sets the determination threshold TH in accordance with the above Equation (1). After that, the processing proceeds to Step S70.

In Step S70, the threshold setting unit 153 compares the determination threshold TH with the upper limit LIM. When the determination threshold TH is equal to or less than the upper limit LIM (Step S70; Yes), the processing in the current cycle ends. On the other hand, when the determination threshold TH exceeds the upper limit LIM (Step S70; No), the processing proceeds to Step S80.

In Step S80, the variable threshold setting unit 150 executes error handling. For example, the variable threshold setting unit 150 notifies the driver of abnormality through the HMI unit 50. In addition, the driving control unit 110 may notify the driver of "termination of the automatic steering control" through the HMI unit 50. In that case, the driving control unit 110 terminates the automatic steering control after confirming that the hands-on state has continued for a certain period of time.

According to the process flow shown in FIG. 9, the determination threshold TH changes, for example, as follows. At first, the driver performs manual driving. The determination threshold TH is set based on the upper friction torque TF estimated by the normal-input friction estimation method. After that, the automated driving control by the driving control unit 110 is started. After the automated driving control is started, the determination threshold TH is set based on the upper friction torque TF estimated by the inverse-input friction estimation method. That is, the accuracy of the determination threshold TH is improved. Thereafter, the determination threshold TH is updated repeatedly.

4. VARIOUS EXAMPLES OF DRIVING CONTROL

The driving control unit 110 executes driving control based on a result of the driver state determination processing by the driver state determination unit 140. Hereinafter, various examples of the driving control will be described.

4-1. First Example

Figure 10:
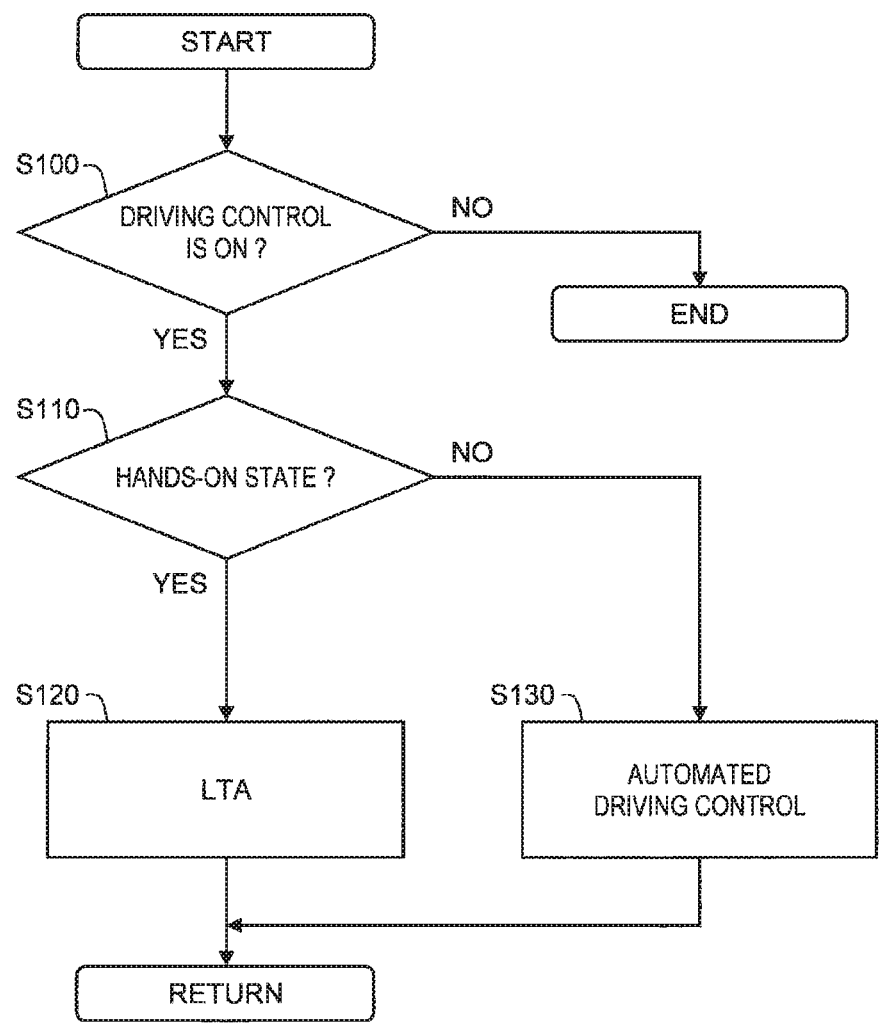
FIG. 10 is a flow chart showing a first example of driving control in the embodiment of the present disclosure.

FIG. 10 is a flow chart showing a first example of the driving control. A process flow shown in FIG. 10 is repeatedly executed every certain cycle.

In Step S100, the driving control unit 110 determines whether or not the driving control is ON (activated). The driver can turn ON/OFF the driving control by using the HMI unit 50. When the driving control is OFF (Step S100; No), the processing ends. On the other hand, when the driving control is ON (Step S100; Yes), the processing proceeds to Step S110.

In Step S110, the driving control unit 110 refers to the result of the driver state determination processing. When the driver state is the hands-on state, or when the hands-on state continues for a certain period of time (Step S110; Yes), the processing proceeds to Step S120. On the other hand, when the driver state is the hands-off state, or when the hands-off state continues for a certain period of time (Step S110; No), the processing proceeds to Step S130.

In Step S120, the driving control unit 110 executes the lane tracing assist (LTA) control. In Step S130, the driving control unit 110 executes the automated driving control. In this manner, according to the first example, the driving control unit 110 switches the driving control between the lane tracing assist control and the automated driving control according to the driver state.

4-2. Second Example

Figure 11:
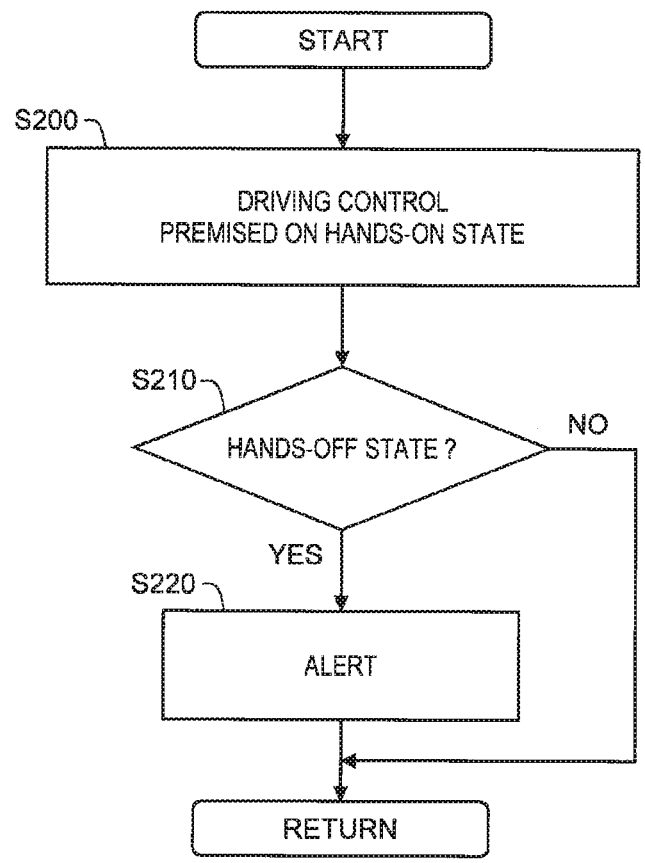
FIG. 11 is a flow chart showing a second example of the driving control in the embodiment of the present disclosure.

FIG. 11 is a flow chart showing a second example of the driving control. A process flow shown in FIG. 11 is repeatedly executed every certain cycle.

In Step S200, the driving control unit 110 executes driving control premised on the hands-on state. The driving control premised on the hands-on state is exemplified by the steering assist control during the manual driving, the lane tracing assist (LTA) control, and so forth.

In Step S210, the driving control unit 110 refers to the result of the driver state determination processing. When the driver state is the hands-off state, or when the hands-off state continues for a certain period of time (Step S210; Yes), the processing proceeds to Step S220. Otherwise (Step S210; No), the processing in the current cycle ends.

In Step S220, the driving control unit 110 issues an alert to the driver through the HMI unit 50. For example, the driving control unit 110 outputs an alert message such as "Hold the steering wheel". As a result, the driver state is expected to return to the hands-on state.

4-3. Third Example

Figure 12:
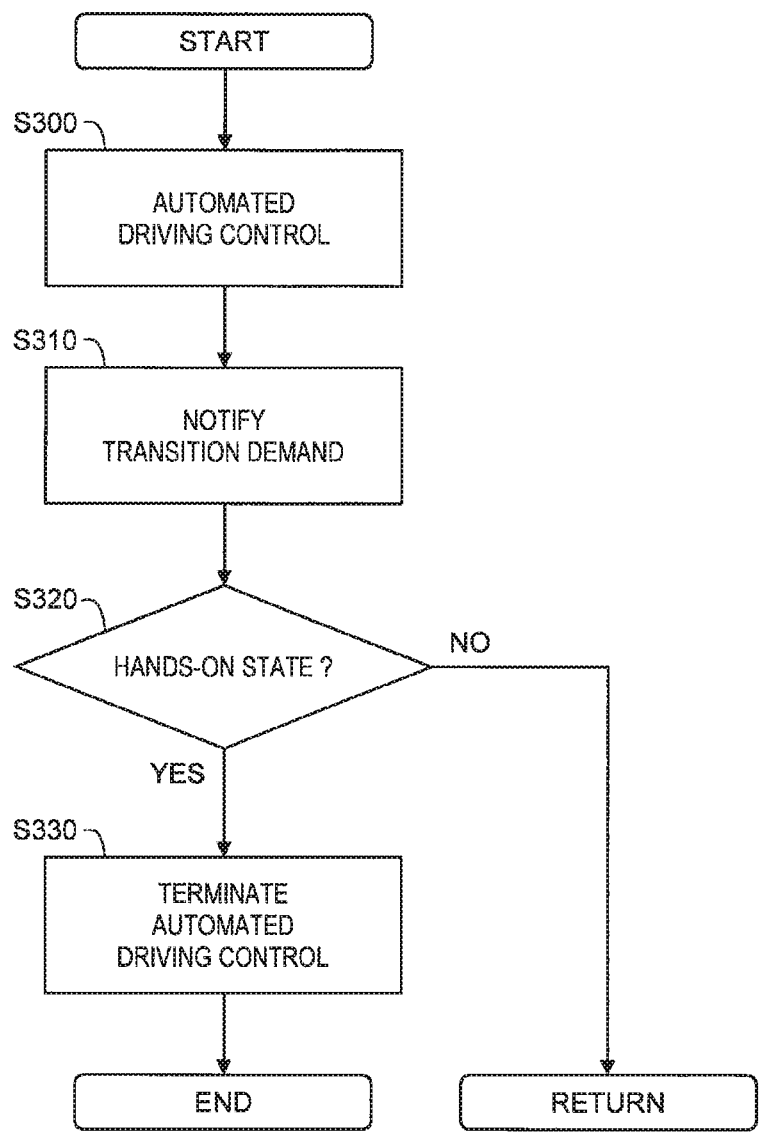
FIG. 12 is a flow chart showing a third example of the driving control in the embodiment of the present disclosure.

FIG. 12 is a flow chart showing a third example of the driving control. A process flow shown in FIG. 12 is repeatedly executed every certain cycle.

In Step S300, the driving control unit 110 executes the automated driving control.

In Step S310, the driving control unit 110 notifies the driver of the transition demand through the HMI unit 50. After that, the processing proceeds to Step S320.

In Step S320, the driving control unit 110 refers to the result of the driver state determination processing. When the driver state is the hands-on state, or when the hands-on state continues for a certain period of time (Step S320; Yes), the processing proceeds to Step S330. Otherwise (Step S320; No), the processing in the current cycle ends.

In Step S330, the driving control unit 110 terminates the automated driving control. At this time, the driving control unit 110 may output a confirmation message such as "Switch to manual driving" through the HMI unit 50.

5. EFFECTS

According to the present embodiment, as described above, the vehicle control system 10 executes the driver state determination processing based on the comparison between the sensor-detected torque MT and the determination threshold TH. Furthermore, the vehicle control system 10 variably sets the determination threshold TH according to a variation in the upper friction torque TF. More specifically, the vehicle control system 10 repeatedly estimates the upper friction torque TF and sets the determination threshold TH to be equal to or greater than the estimated value of the upper friction torque TF. As a result, the accuracy of the driver state determination processing is improved.

As a first comparative example, let us consider the technique disclosed in the above-mentioned Patent Literature 1 (Japanese Unexamined Patent Application Publication No. JP-2008-290679). According to the first comparative example, the upper friction torque TF is beforehand estimated through tests and given a fixed value. However, an actual upper friction torque TF varies and thus the setting value of the upper friction torque TF deviates from the actual value. Increase in the deviation caused decrease in the accuracy of the driver state determination processing.

As a second comparative example, let us consider a case where the determination threshold TH is set to a sufficiently large value or a sufficiently small value in anticipation of the variation in the upper friction torque TF. Also in this case, the setting value of the upper friction torque TF deviates from the actual value, and thus the accuracy of the driver state determination processing is decreased.

If the determination threshold TH is set to an unnecessarily small value, the following problem is caused. For example, the driver performs the steering operation in response to the transition demand. The automatic steering control is terminated when it is determined that the driver state is the hands-on state. However, when the determination threshold TH is too small, it is likely that the driver state is erroneously determined to be the hands-on state even though the actual driver state is still the hands-off state. If the automatic steering control is terminated despite the erroneous determination, the vehicle 1 may depart from a lane.

If the determination threshold TH is set to an unnecessarily large value, the following problem is caused. For example, the driver performs the steering operation in response to the transition demand. The automatic steering control continues until a timing when the driver state is determined to be the hands-on state. As the determination threshold TH becomes larger, the timing delays further and thus the driver is more likely to feel a sense of strangeness in the steering operation. It is also conceivable that the driver performs the steering operation rapidly in order to avoid collision but avoidance behavior of the vehicle 1 delays. In this manner, when the determination threshold TH is unnecessarily large, controllability with respect to steering is decreased.

According to the present embodiment, the accuracy of the driver state determination processing is improved. Therefore, the erroneous determination of the driver state is suppressed. Furthermore, the decrease in controllability with respect to steering is suppressed. These contribute to increase in confidence in the vehicle control system 10.

6. ESTIMATION OF DRIVER STEERING TORQUE

The control device 100 according to the present embodiment may have a function of estimating a driver steering torque MTD. The driver steering torque MTD, which is a torque applied by the driver for rotating the steering wheel 3, indicates strength of the steering operation by the driver. The above-described driver state determination unit 140 may execute the driver state determination processing by using the estimated driver steering torque MTD instead of the sensor-detected torque MT.

Figure 13:
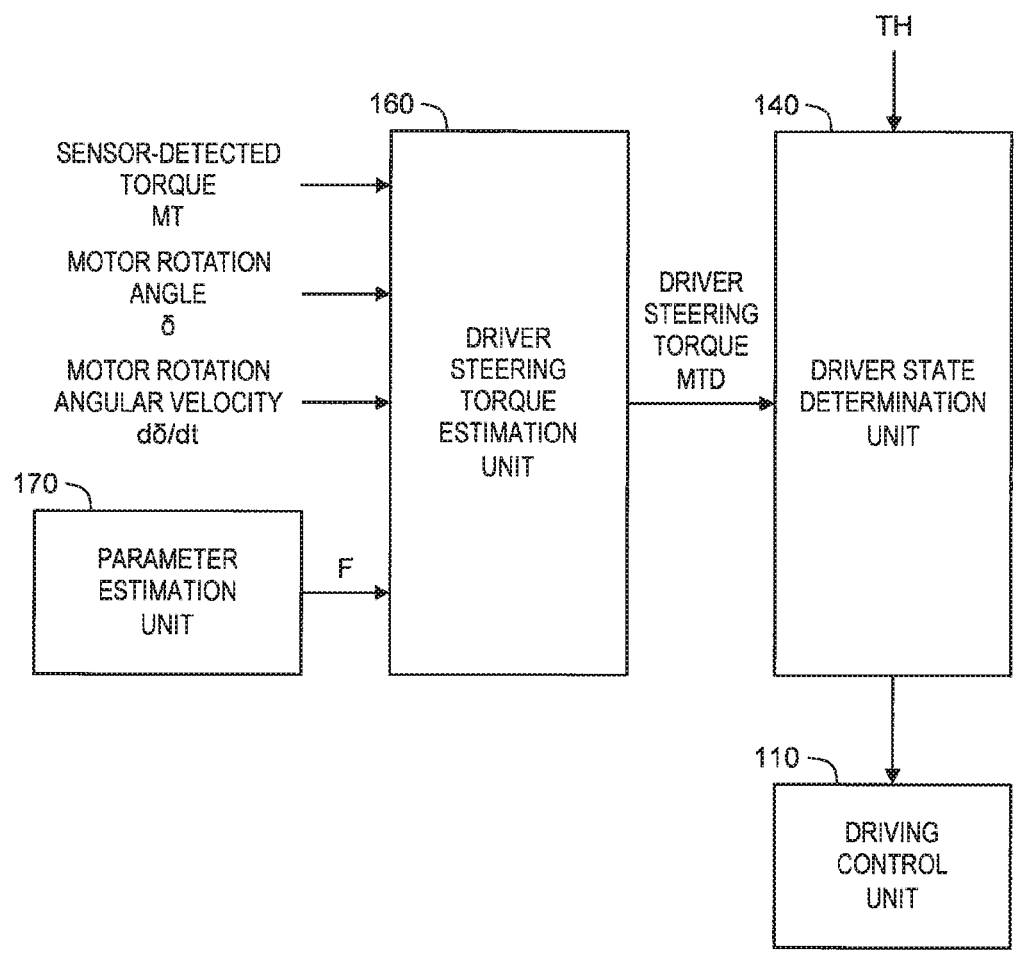
FIG. 13 is a block diagram showing a functional configuration of the control device of the vehicle control system according to the embodiment of the present disclosure.

FIG. 13 is a block diagram showing a functional configuration of the control device 100. The control device 100 includes a driver steering torque estimation unit 160 and a parameter estimation unit 170 in addition to the foregoing functional configuration. These functional blocks are achieved by the processor of the control device 100 executing a control program stored in the memory.

The driver steering torque estimation unit 160 executes "driver steering torque estimation processing" that estimates the driver steering torque MTD. A method of estimating the driver steering torque MTD is not limited in particular. For example, the driver steering torque estimation unit 160 uses a model of a steering system to estimate the driver steering torque MTD. In this case, the driver steering torque estimation unit 160 can estimate the driver steering torque MTD based on the sensor-detected torque MT, a motor rotation angle $\delta$, and a motor rotation angular velocity $d\delta/dt$. The motor rotation angle $\delta$, which is a rotation angle of a rotor of the electric motor of the EPS device 20, is detected by a rotation angle sensor not shown. The motor rotation angular velocity $d\delta/dt$ is obtained by differentiating the motor rotation angle $\delta$.

The model of the steering system used in the driver steering torque estimation processing may include a mechanical parameter that varies according to external environment. A typical example of the mechanical parameter varying according to the external environment is mechanical friction varying according to an ambient air temperature. When such the mechanical parameter is fixed to a nominal value, that is, when a nominal model is used regardless of a variation in the external environment, estimation accuracy of the driver steering torque MTD is decreased.

The parameter estimation unit 170 is provided in order to suppress such the decrease in estimation accuracy of the driver steering torque MTD. The parameter estimation unit 170 executes "parameter estimation processing" that estimates the mechanical parameter according to the external environment. The estimated mechanical parameter is hereinafter referred to as an "estimated parameter F". The parameter estimation unit 170 outputs the estimated parameter F to the driver steering torque estimation unit 160. The driver steering torque estimation unit 160 uses the model based on the estimated parameter F to execute the driver steering torque estimation processing. As a result, the decrease in estimation accuracy of the driver steering torque MTD is suppressed.

It should be noted that the parameter estimation unit 170 executes the parameter estimation processing every certain cycle. The estimated parameter F is updated every time the parameter estimation processing is executed. The parameter estimation unit 170 may store a history of the estimated parameter F from its initial value in the memory of the control device 100.

Hereinafter, examples of the parameter estimation processing by the parameter estimation unit 170 will be described.

6-1. First Example

Figure 14:
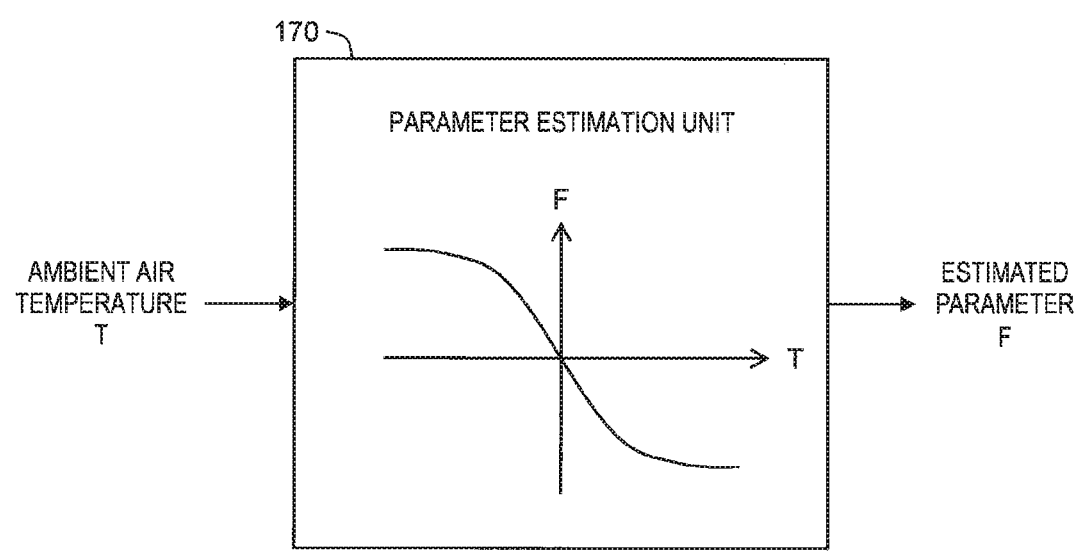
FIG. 14 is a conceptual diagram for explaining a first example of parameter estimation processing in the embodiment of the present disclosure.

FIG. 14 is a conceptual diagram for explaining a first example of the parameter estimation processing. In the first example, let us consider the mechanical parameter (e.g. the mechanical friction) that varies according to the ambient air temperature T. In this case, the estimated parameter F is expressed by a function of the ambient air temperature T. The function, that is, a correspondence relationship between the ambient air temperature T and the estimated parameter F is given by a map or a formula. The parameter estimation unit 170 receives information of the ambient air temperature T detected by an ambient air temperature sensor (not shown). Then, the parameter estimation unit 170 acquires the estimated parameter F based on the ambient air temperature T and the above-described function.

If the ambient air temperature sensor fails, the parameter estimation unit 170 may stop the parameter estimation processing. In this case, the parameter estimation unit 170 outputs the estimated parameter F acquired immediately before the ambient air temperature sensor fails. Since the ambient air temperature does not change rapidly, using the estimated parameter F acquired immediately before the ambient air temperature sensor fails can suppress the decrease in estimation accuracy of the driver steering torque MTD.

If the failure of the ambient air temperature sensor continues for a certain period of time or longer, the ambient air temperature may change during the certain period of time. In that case, the parameter estimation unit 170 may gradually change the estimated parameter F (output) to the initial value.

6-2. Second Example

Figure 15:
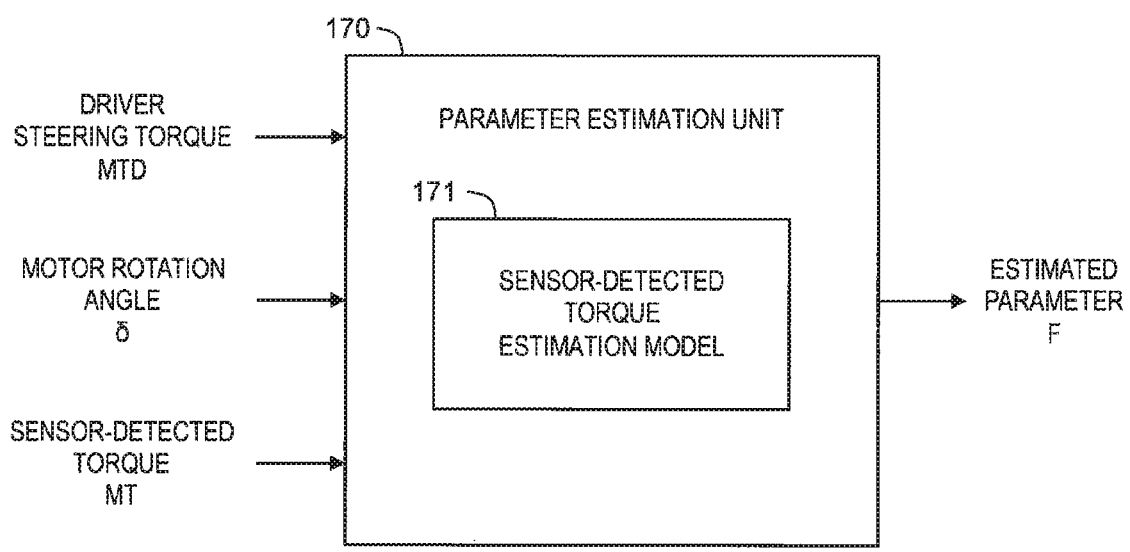
FIG. 15 is a conceptual diagram for explaining a second example of the parameter estimation processing in the embodiment of the present disclosure.

FIG. 15 is a conceptual diagram for explaining a second example of the parameter estimation processing. In the second example, the parameter estimation unit 170 includes a sensor-detected torque estimation model 171.

The sensor-detected torque estimation model 171 is a model for estimating the sensor-detected torque MT detected by the torque sensor 42. The sensor-detected torque estimation model 171 is obtained by modifying the model used by the driver steering torque estimation unit 160 for estimating the driver steering torque MTD.

The parameter estimation unit 170 estimates the sensor-detected torque MT while setting a model parameter of the sensor-detected torque estimation model 171 to various values. The parameter estimation unit 170 compares each estimated value of the sensor-detected torque MT with an actual value of the sensor-detected torque MT. Then, the parameter estimation unit 170 outputs a model parameter with which the estimated value closest to the actual value can be obtained, as the estimated parameter F.

Figure 16:
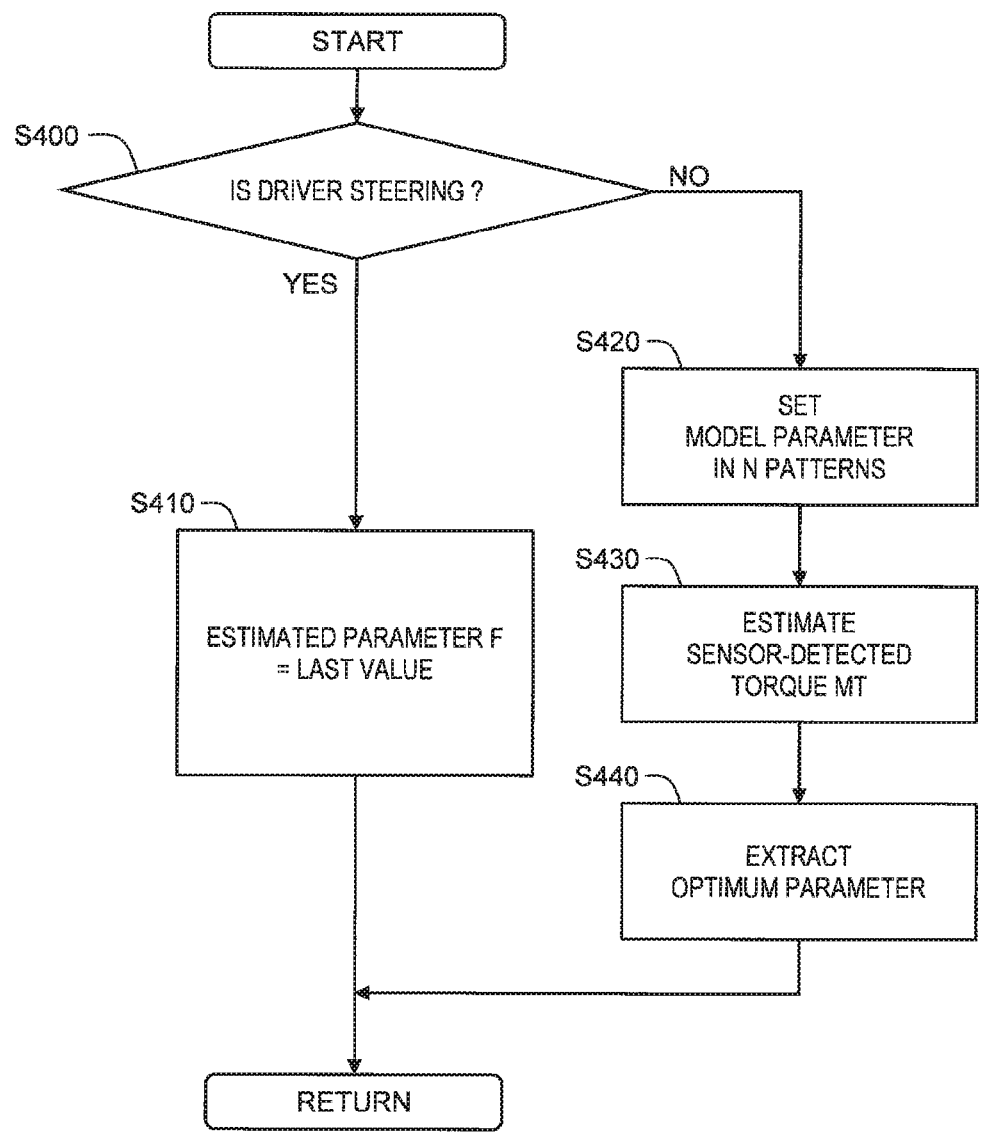
FIG. 16 is a flow chart for explaining the second example of the parameter estimation processing in the embodiment of the present disclosure.

FIG. 16 is a flow chart for explaining the second example of the parameter estimation processing. A process flow shown in FIG. 16 is repeatedly executed every certain cycle.

In Step S400, the parameter estimation unit 170 determines whether or not the steering operation is being performed by the driver. For example, the parameter estimation unit 170 compares an absolute value of the driver steering torque MTD estimated by the driver steering torque estimation unit 160 with a predetermined threshold. When the absolute value of the driver steering torque MTD is greater than the predetermined threshold, the parameter estimation unit 170 determines that the steering operation is being performed by the driver. As another example, the parameter estimation unit 170 may determine whether or not the steering operation is being performed by the driver based on a result of measurement by the driver monitor 70 (see FIG. 8).

When the steering operation is being performed by the driver (Step S400; Yes), estimation accuracy of the sensor-detected torque MT may be decreased. In this case, therefore, the parameter estimation unit 170 outputs a last value of the estimated parameter F without executing the parameter estimation processing (Step S410).

On the other hand, when the steering operation is not being performed by the driver (Step S400; No), the parameter estimation unit 170 executes the parameter estimation processing. The parameter estimation processing includes the following Steps S420 to S440.

In Step S420, the parameter estimation unit 170 sets the model parameter of the sensor-detected torque estimation model 171. More specifically, the parameter estimation unit 170 sets the model parameter in N patterns (N is an integer equal to or more than 2). For example, the parameter estimation unit 170 sets N types of model parameter that follow a normal distribution with a mean $\mu$. The mean $\mu$ is, for example, the last value of the estimated parameter F. As another example, the mean $\mu$ may be extrapolated from the last value and one before the last value of the estimated parameter F. The N types of model parameter may include a nominal value.

In Step S430, the parameter estimation unit 170 estimates the sensor-detected torque MT by using the sensor-detected torque estimation model 171 based on each of the N types of model parameter. An input to the sensor-detected torque estimation model 171 is, for example, the motor rotation angle $\delta$. A motor target command torque or a target current value may be used instead of the motor rotation angle $\delta$.

In Step S440, the parameter estimation unit 170 compares each of the estimated values of the sensor-detected torque MT with an actual value of the sensor-detected torque MT. The parameter estimation unit 170 extracts a model parameter with which the estimated value closest to the actual value can be obtained, as an optimum parameter. For example, the parameter estimation unit 170 calculates a difference between the actual value and the estimated value, and extracts a model parameter with which the difference is minimum as the optimum parameter. Then, the parameter estimation unit 170 outputs the extracted optimum parameter as the estimated parameter F.

6-3. Third Example

As described above, the upper friction estimation unit 152 estimates the upper friction torque TF (see FIGS. 4 to 9). The parameter estimation unit 170 may estimate a friction term (the estimated parameter F) of the model of the steering system based on the upper friction torque TF estimated by the upper friction estimation unit 152.

What is claimed is:

1. A vehicle control system installed on a vehicle, the vehicle comprising:
a wheel;
a steering wheel; and
a turning mechanism coupled to the steering wheel through a steering shaft and configured to turn the wheel according to a rotating operation of the steering wheel, the vehicle control system comprising:
a torque sensor configured to detect a torque applied to a first position of the steering shaft, as a sensor-detected torque; and
a control device configured to execute automatic steering control that turns the wheel,
wherein:
an upper friction torque is an absolute value of the sensor-detected torque that is caused by a friction force acting on the steering shaft between the first position and the steering wheel when the steering shaft is rotated;
a hands-on state is a driver state where a driver of the vehicle intervenes in steering of the vehicle;
a hands-off state is a driver state other than the hands-on state; and
the control device is further configured to execute:
upper friction estimation processing that repeatedly estimates the upper friction torque based on the sensor-detected torque when the wheel is turned;
threshold setting processing that variably sets a determination threshold to be equal to or greater than an estimated value of the upper friction torque; and
driver state determination processing that determines that the driver state is the hands-on state when the absolute value of the sensor-detected torque is greater than the determination threshold, and determines that the driver state is the hands-off state when the absolute value of the sensor-detected torque is the determination threshold or less,
wherein the control device determines whether or not the driver takes hands off the steering wheel, and when the driver takes the hands off the steering wheel during execution of the automatic steering control, the control device executes the upper friction estimation processing, and
in the upper friction estimation processing, the control device estimates the absolute value of the sensor-detected torque at a time when the steering wheel starts to be rotated due to the automatic steering control, as the upper friction torque.

* * * * *